US005517465A

United States Patent [19]

Nestler et al.

[11] Patent Number: 5,517,465

[45] Date of Patent: May 14, 1996

+

[54] MULTIPLE SENSOR FISH SURROGATE FOR ACOUSTIC AND HYDRAULIC DATA COLLECTION

[75] Inventors: John M. Nestler; James L. Pickens, both of Vicksburg, Miss.; Jim Evans, Tallulah, La.; Richard W. Haskins, Raymond, Miss.

[73] Assignee: U.S. Army Corps of Engineers as represented by the Secretary of the Army, Washington, D.C.

[21] Appl. No.: 364,919

[22] Filed: Dec. 28, 1994

[51] Int. Cl.$^{6}$ .................................................. H04B 1/02

[52] U.S. Cl. .......................... 367/139; 367/191; 367/173; 367/153; 119/174; 43/1; 43/4

[58] Field of Search .................................... 367/191, 173, 367/153, 139; 119/174; 43/1, 4

[56] References Cited

U.S. PATENT DOCUMENTS

| | | | |
|---|---|---|---|
| 4,380,808 | 4/1983 | Hill et al. | 367/153 |
| 4,689,777 | 8/1987 | Roever | 367/153 |

*Primary Examiner*—J. Woodrow Eldred
*Attorney, Agent, or Firm*—Luther A. Marsh

[57] ABSTRACT

Acoustic signals and hydraulic pressure variations which influence fish behavior in bodies of water are measured and recorded by apparatus simulating a fish immersed in water, fitted with piezoelectric transducers and connected by wiring to remote amplifying and recording means. Such data are correlated with fish behavior for the purpose of developing methods of diverting fish from such areas of danger as the intake piping of hydroelectric power generating turbines and pumping stations.

5 Claims, 1 Drawing Sheet

MULTIPLE SENSOR FISH SURROGATE FOR ACOUSTIC AND HYDRAULIC DATA COLLECTION

GOVERNMENT INTEREST STATEMENT

Figure 1:
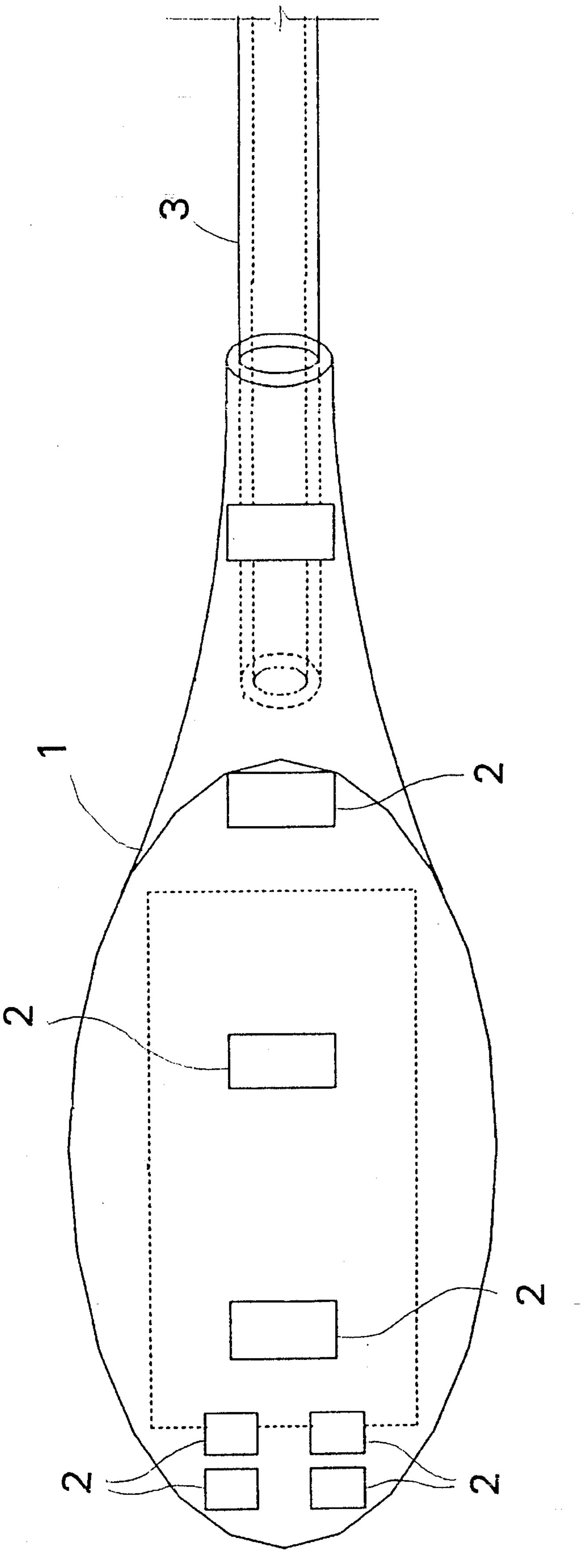

The invention described herein may be manufactured, licensed, and used by or for governmental purposes without the payment of any royalties thereon.

BACKGROUND OF THE INVENTION

1. Field of Invention

This invention relates to apparatus for studying the relation between acoustic signals and hydraulic pressure variations in water and fish behavior. More specifically, it relates to apparatus simulating a specific fish and its perception of acoustic signals and hydraulic pressure variations for correlation with fish movement towards, or away from, zones of danger to fish, such as the intakes of hydroelectric power generating turbines.

2. Prior Art

Studies in the past of fish behavior was based on the assumption that the sound field factors influencing fish movement could be represented by mathematical models based on the acoustic fields of simple sources such as dipoles and monopoles. These studies generally deal with the compressional wave component of sound fields and neglect the particle motion component. They do not adequately describe the sound fields that influence fish behavior, expecially in areas of high turbulence. The lateral line of fish is known to be a very important sensory organ, containing hair cells which transfer mechanical hair motion caused by pressure differences and particle motion to neuro-electrical impulses. The function of this important sensory organ is not taken into account by methods known to the art.

SUMMARY OF THE INVENTION

Many valuable fish species are in serious decline, requiring human intervention to prevent further decline and extinction. Such intervention includes the use of apparatus and methods for diverting or repelling fish away from zones of danger to fish, such as the intakes of hydrolelectric power generating turbines, or the intakes of pumping stations used during off-peak hours for pumping water from the low side of the hydroelectric power dam to the upstream reservoir, for later release through the turbines during peak demand periods, or the intakes of water diversion structures.

The apparatus of this invention is a fish surrogate, with a plurality of piezoelectric sensors emulating the sensory organs of a fish. The fish surrogate with piezoelectric sensors is immersed in flowing water and the output of the sensors is amplified and recorded by appropriate recording equipment. The measurements are made in areas of lakes and streams that are consistently avoided by fish to establish acoustic parameters for diverting fish away from zones of danger.

III. BRIEF DESCRIPTION OF THE DRAWING

FIG. 1 shows a schematic view of the fish surrogate of this invention.

IV. DETAILED DESCRIPTION OF THE INVENTION

With reference to FIG. 1, the fish surrogate comprises a hollow enclosure 1 having the approximate size and shape of the fish under study. Fiberglass-reinforced epoxy or polyester resins are the preferred materials for constructing the hollow enclosure of the fish surrogate. Other materials may be used provided that they seal the interior of the fish surrogate enclosure against water intrusion. A plurality of piezoelectric sensors 2, ranging in number from 2 to 100 but preferably about 16, are mounted on the exterior surface of the fish surrogate enclosure in the areas of the enclosure corresponding to the location of sensory areas on the actual fish. Thus, about eight sensors may be located on what corresponds to the head of the fish. Eight or more sensors may be located along what corresponds to the lateral line of the fish. The output signals of the sensors pass by wires (not shown) to the interior of the surrogate enclosure, being properly sealed against water leakage. The wiring from the sensors (not shown) further pass through a pipe 3 connecting to the surrogate enclosure and also serving as a support for the fish surrogate. The wires transmitting the sensor outputs are then connected to remote amplifying and recording equipment (not shown). The signals recorded during test runs, during which the fish surrogate is immersed in water, may be analyzed and displayed as needed by electronic data manipulation and display means. Acoustic signals and hydraulic pressure variations which tend to divert fish may thus be identified and then used by duplication of such signals and pressure variations to divert fish from zones of danger, such as the intakes to hydroelectric power generating turbines.

While this invention has been described in terms of a specific preferred embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and of the limits of the appended claims.

What is claimed is:

1. Apparatus for measuring the relation between acoustic signals, pressure variations in water and fish behavior comprising:

(a) a hollow fish surrogate enclosure corresponding in size and shape to a fish being studied;

(b) a plurality of piezoelectric sensors mounted on the exterior of the enclosure;

(c) electrical wires connected to the sensors for transmitting output signals from the sensors;

(d) a supporting pipe affixed to the enclosure, the electrical wires from the sensors passing through the support pipe; and (e) electronic amplifying and recording means connected to the wires, for recording acoustic signals sensed in the water.

2. Apparatus according to claim 1 wherein the enclosure is made of material selected from the group consisting of fiberglass-reinforced epoxy resin and fiberglass-reinforced polyester resin.

3. Apparatus according to claim 1 wherein the number of sensors is between 2 and 100.

4. Apparatus according to claim 1 wherein the number of sensors is at least 16.

5. Apparatus according to claim 1 wherein the location of the sensors is one half on what corresponds to the head of the fish and one-half on what corresponds to the lateral line of the fish.

* * * * *